United States Patent [19]

Karpiloff

[11] 4,436,777

[45] Mar. 13, 1984

[54] METHOD FOR MAKING DECORATED BATTERY CASINGS

[75] Inventor: Kenneth M. Karpiloff, New Rochelle, N.Y.

[73] Assignee: Duracell Inc., Bethel, Conn.

[21] Appl. No.: 328,566

[22] Filed: Dec. 8, 1981

[51] Int. Cl.³ .................... B32B 1/08; H01M 2/02
[52] U.S. Cl. ...................... 428/36; 53/442; 53/557; 53/563; 53/585; 156/69; 156/84; 156/86; 156/277; 156/294; 264/230; 264/342 R; 428/203; 428/206; 428/910; 429/167; 429/176
[58] Field of Search ............... 53/49, 442, 557, 563, 53/585; 156/69, 84, 86, 294, 277; 29/623.1, 623.4; 264/230, 342 R; 428/203, 206, 36, 910; 429/167, 176

[56] References Cited

U.S. PATENT DOCUMENTS 2,595,963  5/1952  Lewis et al. .................. 429/167
3,630,783  12/1971  Przybyla ..................... 429/167 X
3,881,601  5/1975  Walus et al. ................. 206/333 X Primary Examiner—Robert A. Dawson
Attorney, Agent, or Firm—Ronald S. Cornell; Israel Nissenbaum

[57] ABSTRACT

A method for making decorated battery casings wherein a thin walled heat shrinkable plastic tubing is cut to size, placed on a support member such as a mandrel, heat shrunk, decorated with decorative materials and protective coatings thereon and crimped at one end. The casing is then removed from the mandrel, placed upon a cell or battery and crimped at the other end to complete the battery or cell encasing procedure. The procedure is particularly efficacious in providing metallic decorated plastic battery casings.

13 Claims, 1 Drawing Figure

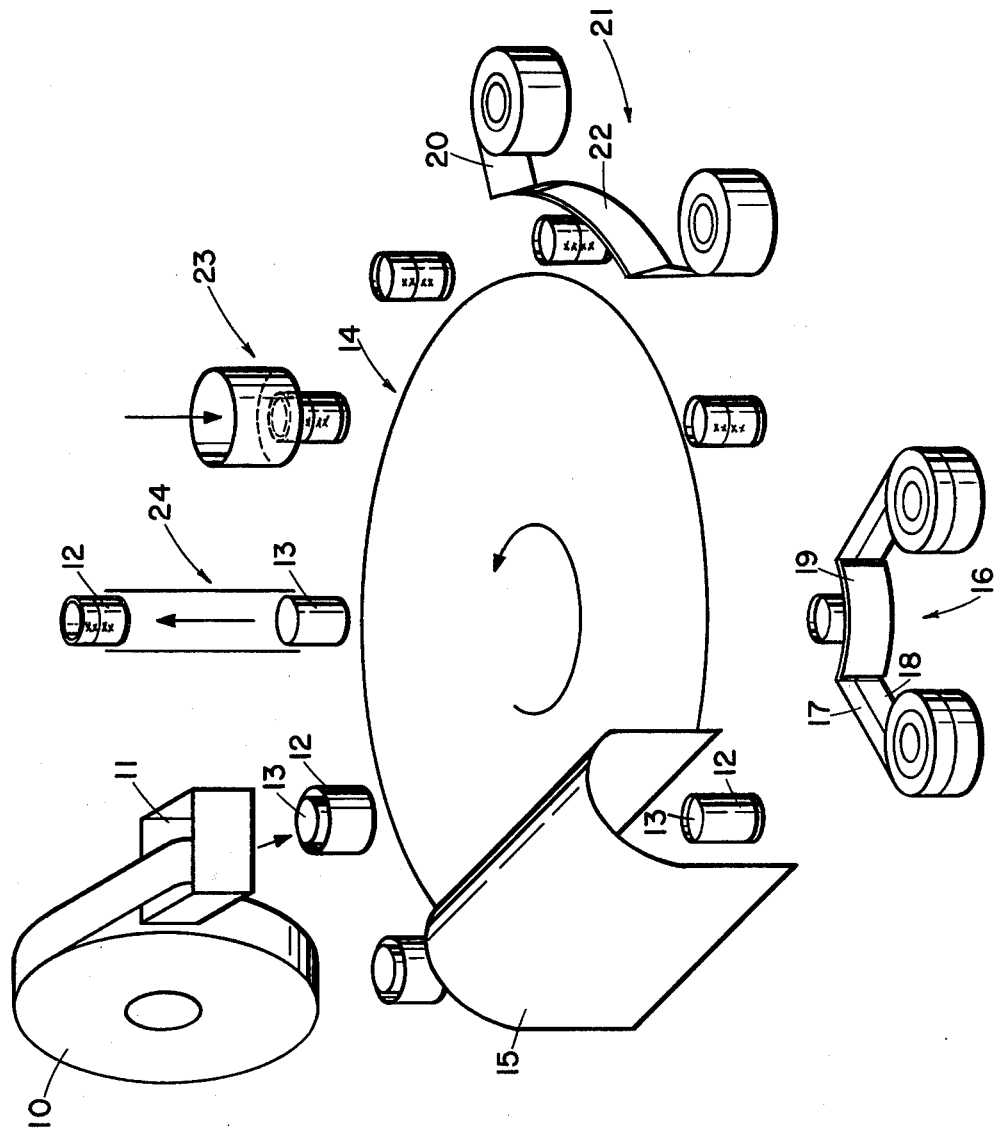

METHOD FOR MAKING DECORATED BATTERY CASINGS

The present invention relates to methods for making battery casings, particularly those comprised of plastic and having decorative labeling thereon.

Battery or cells are generally constructed, in the most commonly utilized varieties, with metallic containers enclosing the generally corrosive cell components. The metallic container is then enclosed with a printed decorative outer casing or decorative labels are affixed thereto for consumer appeal, informative notices, trademark identification and the like. The outer casings have generally been comprised of cardboard for the less expensive leclanche cells or metal for the costlier alkaline cells. Plastic casings have also been utilized and have generally been made of relatively thick materials such as ABS (acrylonitrile butadiene styrene) having structural integrity. Heat shrink plastics such as unprinted or preprinted PVC (polyvinylchloride) have occasionally been utilized but with the disadvantage that such materials when heat shrunk on the battery or cell conformed to every imperfection in the underlying materials or container thereby forming an unsightly package.

For applications wherein the decorative materials are metallic obviously the most preferred casing material is metal. In fact, preprinted metallic coated plastic heat shrink materials tend to distort when shrunk onto cells or batteries. Metal casings, however, have several disadvantages, not least of which is the high cost thereof. The metal casings, because of their electrical conductivity and their proximity to the electrical cell must be properly insulated therefrom in order to reduce the possibility of short circuits between the cell or battery terminals. Furthermore, the metal used in such casings is relatively thick thereby reducing, within specified cell dimension parameters, available volume for the active cell materials.

It is an object of the present invention to provide an economical method for making decorated battery or cell casings which are resistant to mechanical and chemical degradation.

It is a further object of the present invention to provide such method wherein the battery or cell casings are comprised of plastic with decorative metallics thereon.

It is a still further object of the present invention to provide such thin plastic in place of metallic casings whereby available cell volume is increased and cell capacity may be enhanced.

These and other objects, features and advantages of the present invention will become more apparent from the following discussion as well as the drawing in which the single FIGURE schematically depicts the operative and optional steps of the present invention and the apparatus which may be utilized in carrying out such steps.

Generally, the present invention comprises the making of decorated battery or cell casings (and such casings), wherein a thin walled heat shrinkable enclosure, e.g. 0.004" (0.010 cm) heat shrinkable plastic tubing of proper dimensions is positioned on a supporting member or mandrel. The mandrel is preferably slightly larger (on the order of about 0.002" (0.005 cm) is generally sufficient) than the cell to facilitate emplacement of the subsequently heat shrunk tube on the cell after removal from the mandrel. The tubing may be seamed, unseamed, oval and the like with the unseamed being preferred because of aesthetic considerations. The tubing is heat shrunk on the mandrel, decorated by a suitable printing process, such as hot stamping, coated with a protective layer, if necessary (such as on a metallic decoration), optionally crimped at one end to enhance structural integrity, and removed from the mandrel for final placement on the battery or cell where the other end of the casing is crimped to complete the encasing procedure. By heat shrinking the casing prior to emplacement on the battery or cell (hereinafter the term battery will include both battery and cell) imperfections of the battery are not made visible in the casing as in prior art batteries. Furthermore, the method of the present invention can be completely and therefore economically automated.

The FIGURE illustrates the steps involved in the formation of the decorated enclosure member of the present invention.

The procedure is more clearly illustrated in the drawing wherein flat unseamed heat shrinkable tubing such as of PVC is fed from roll stock 10 to a cutting and opening device 11 wherein the tubing is cut to predetermined dimensions and opened. The sized and opened tubing 12 is then placed on a mandrel 13 which is part of a rotating dial 14 having operational indexed stations therearound. The mandrel 13 with sized tubing 12 thereon initially passes through heat shrink tunnel station 15 wherein the tubing 12 is preshrunk to the requisite final battery casing dimensions. This is in contrast to the prior art heat shrink encasing procedures in which the material is initially heat shrunk on the battery itself. Alternatively, the mandrel itself may be heated to effect the heat shrinking. Thereafter, the mandrel 13 with the heat shrunk tubing 12 thereon passes to decoration station 16 where the heat shrunk tubing is printed and decorated such as with abutted metallic foils 17 and 18 with a pressure heat transfer (hot stamping) by die 19. Because of the thinness (e.g. 0.0002" (0.0005 cm)) of the metallic foils and their tendency to wander relative to each other, proper guides with feeding beds (not shown) for the foils are required in order to maintain proper registry of the die imprintation. Depending upon the heat shrinkable material utilized and the degree of heat shrinking necessary, the hot stamping itself may be utilized to effect the heat shrinking when only minimal shrinkage is required.

Application of a chemically resistant transparent coating 20 to the decorated tubing 12 takes place at the next operative station 21 by a similar hot stamping with die 22. The coating 20 is applied to prevent mechanical and chemical degradation of the relatively fragile metallic foil decoration. Accordingly, the coating 20 which is used will be selected for its resistance to the common corrosive chemical components contained within batteries such as KOH found in alkaline batteries and dimethoxyethane found in $Li/MnO_2$ batteries. With the application of the protective coating 20, the metallic foil decoration is also thereby rendered isolated from possible electrical shorting with the battery components. If the decoration of the tubing 12 is not of a fragile nature such as the aforementioned metallic foils, such coating step may be an optional procedure, to protect the ink on the printed tubing 12 or the heat shrink material itself.

After the application of the protective coating 20, the mandrel with preshrunk, decorated and coated tubing 12 is indexed to crimping station 23 where the tubing is partially raised from the mandrel and crimped at one end with heat facilitating such crimping. The crimping is optional but preferred to enhance structural integrity and rigidity of the thin tube and to facilitate later battery encasing by providing a stop for the battery within the casing. The preshrunk, decorated, coated and crimped tube 12 is thereafter indexed to ejection station 24 where it is ejected and only then used to complete the fixed encasing or enclosure of a battery by crimping the other end. To facilitate the ejection the mandrel is initially formed of or coated with a material, such as polytetrafluoroethylene (PTFE), having a low coefficient of friction.

Because of the thinness of the tubing and decorative coatings as compared to metal or rigid plastic casings (the tubing is about half the thickness) more cell volume is available for active materials.

Typical heat shrink materials utilizable for the tubing in the present invention include in addition to PVC, polyolefins such as polyethylene, and polypropylene; polyvinylidene chloride; polyester; nylon etc.

Protective coating materials include thin films, e.g. (0.0002" (0.0005 cm)) of the aforementioned materials suitable for the heat shrinkable tubing.

If desired the heat shrink tubing may form an additional seal for the battery. For example, the battery top may be peripherally coated with a sealent such that upon heat crimping of the tubing thereon a seal is formed thereby.

To facilitate decorative coloration of the heat shrink tubing it will preferably be of a coloration which forms a base coloration or major part of the decorative coloration. For example, current batteries marketed under the Duracell ® trademark, for the most part, have the configuration of copper (an exclusively metallic color) and black bands, with black and silver (metallic) imprinting. Thus, in accordance with the above procedure, at decoration station 16 the metallic foils 17 and 18 are copper and silver colored and the base heat shrinkable material is black in order to provide the requisite casing decorations.

It is understood that the drawing and preceding discussion are illustrative of the method of the present invention and that changes in apparatus, materials and procedural operations are possible without departing from the scope of the present invention as defined in the following claims.

What is claimed is:

1. A method for making a battery casing from a decorated heat shrinkable enclosure member characterized in that said method comprises the steps of placing said enclosure member on a support member and shrinking said heat shrinkable enclosure member thereon, decorating said enclosure member while on said support member, removing said decorated heat shrunk enclosure member from said support member and fixedly enclosing a battery therewithin.

2. The method of claim 1 wherein said support member is a mandrel having a diameter slightly larger than said battery.

3. The method of claim 2 wherein said mandrel has a surface comprised of a material having a low coefficient of friction.

4. The method of claim 1 wherein said enclosure member is decorated with a metallic foil.

5. The method of claim 4 wherein said enclosure member is decorated by hot stamping.

6. The method of claim 4 wherein said metallic foil decoration is covered with a transparent protective film coating.

7. The method of claims 1, 4, 5 or 6 wherein one end of said enclosure member is crimped prior to said removal from said support member.

8. The method of claim 1 wherein said heat shrinkable enclosure member is comprised of flat tubing which is cut to size and opened prior to emplacement on said support member.

9. The method of claim 1 wherein said heat shrinkable enclosure member is comprised of PVC.

10. A decorated battery casing made in accordance with the method of claims 1, 2, 3, 4, 5, 6, 8 or 9.

11. A method for enclosing a battery with a decorated casing comprising the steps of heat shrinking a heat shrinkable enclosure member to a predetermined size, decorating said enclosure member, then placing a battery therewithin, and heat crimping at least one end of said enclosure to contain said battery therewithin.

12. The method of claim 11 wherein one end of said enclosure member is heat crimped prior to placing said battery therewithin.

13. A battery with decorated casing made in accordance with claims 11 or 12.

* * * * *